UNITED STATES PATENT OFFICE.

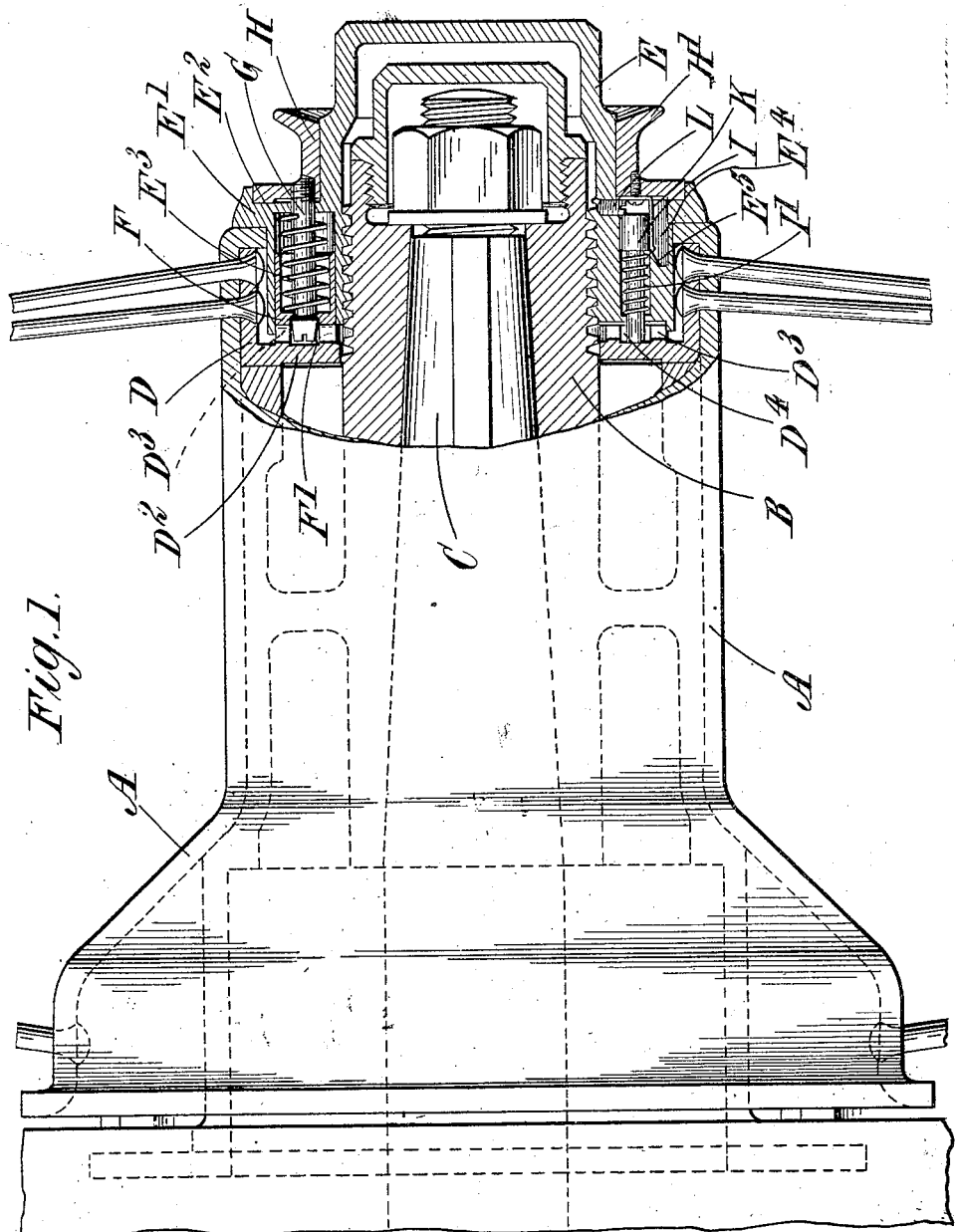

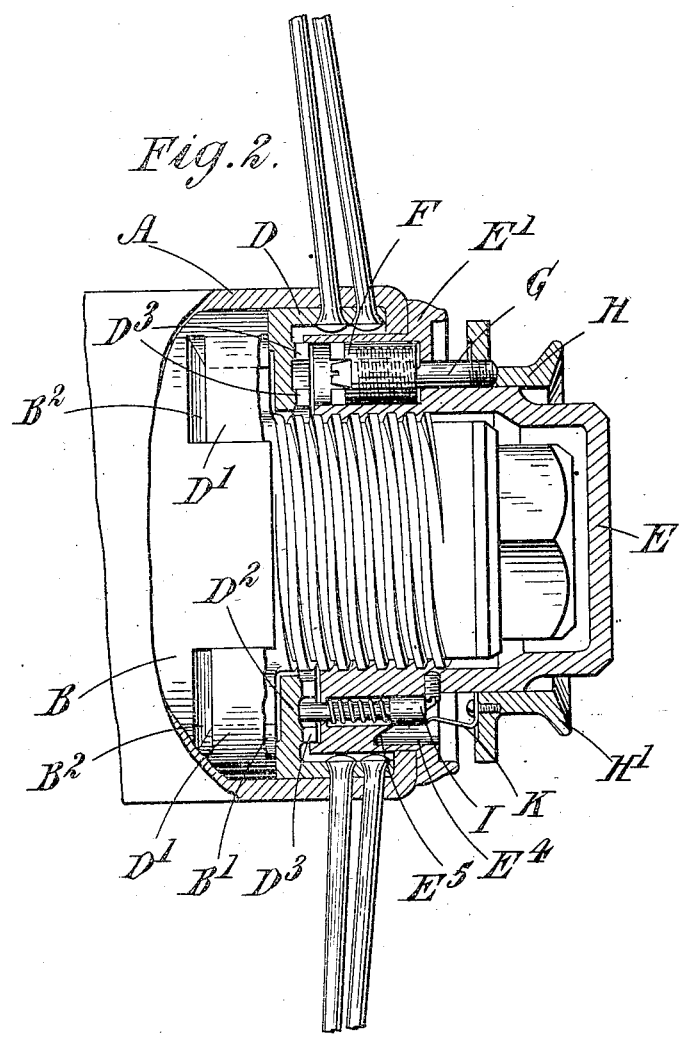

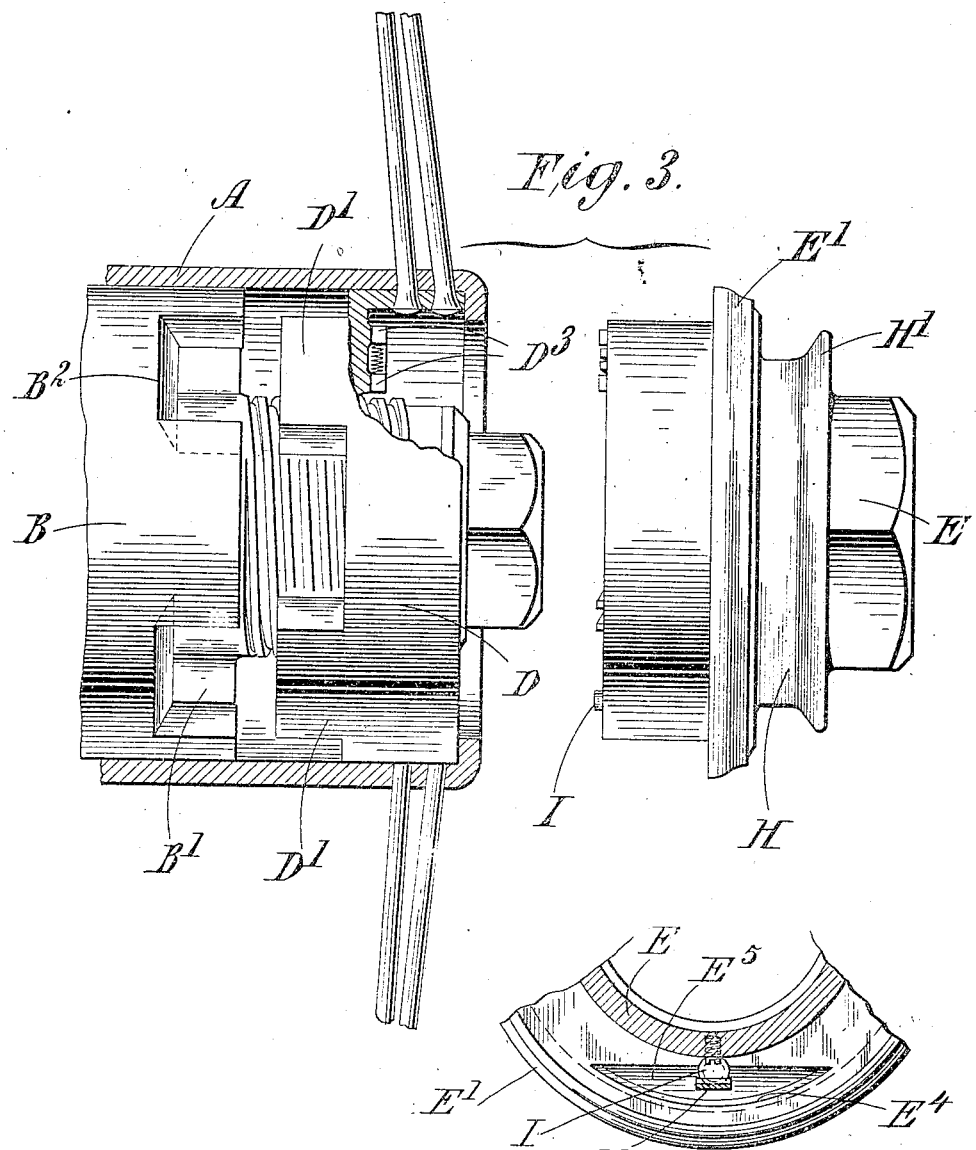

STEPHEN JAMIESON RALPH, OF STOCKTON, ENGLAND, ASSIGNOR TO GEORGE KEEBLE, OF LINCOLN ROAD, PETERBOROUGH, ENGLAND.

DETACHABLE-WHEEL-SECURING MECHANISM.

1,049,146.  Specification of Letters Patent.  Patented Dec. 31, 1912.

Application filed May 12, 1911. Serial No. 626,868.

*To all whom it may concern:*

Be it known that I, STEPHEN JAMIESON RALPH, a subject of the King of England, residing at Stockton-on-Tees, in the county of Durham, England, have invented new and useful Improvements in Detachable-Wheel-Securing Mechanism, of which the following is a specification.

This invention relates to caps for securing detachable wheels and has for its object improvements in the type of wheel securing-mechanism described in my British Patent No. 26380/1909.

In wheel securing-mechanism of the kind referred to, the cap is prevented from unscrewing by means of a ratchet rack and spring pawl device. The cap is provided with permanent mechanism for releasing and holding released the spring pawl or pawls during only the early movement of the cap in unscrewing.

The mechanism comprises a member or ring slidable on the screw cap and preferably operated by the fingers. The outward movement of this sliding ring withdraws the pawl or pawls from engagement with the ratchet rack and the ring is automatically locked and held in its withdrawn position by means of an arrangement of spring pin or pins and spring catches. These spring pins or stops were, in my previous construction, arranged obliquely in the screw cap so that, during the outward movement of the screw cap, the pins, forced inward toward the wheel hub, would move in an angular direction until their heads cleared the spring catches. Springs arranged between the screw cap and sliding ring draw the latter inward. In my previous construction these springs were separate from the springs controlling the pawls and were arranged in pockets in the screw cap separate from the pockets within which the spring pawls work.

According to the present invention the spring pin or pins are arranged to lie and to slide in a line parallel with the axis of the wheel. The spring catch or catches, engaging the head of the pin or pins to hold the sliding ring and pawls in their retracted position, is or are caused to gradually work off the head of the pin or pins by means of an inclined surface or surfaces on the screw cap. According to this invention moreover, the springs for forcing the pawls into engagement with the ratchet rack also serve to draw the sliding ring back into its innermost position when it is released in the act of unscrewing the cap.

The invention further consists of improvements in details of construction and arrangement of the parts as will be hereinafter more fully set forth.

The accompanying drawings illustrate one construction of the present improvements applied to a form of detachable wire wheel.

Figure 1 is a view partly in section showing the wheel secured in position; Fig. 2 is a similar view showing the pawls withdrawn from the rack and held in that position ready for unscrewing the cap; Fig. 3 shows the screw cap removed and the wheel partly withdrawn, and Fig. 4 is a transverse sectional view of the lower portion of Fig. 2.

A indicates the hub of the detachable wheel which is made to slide on the sleeve B keyed to the axle C. In the example shown the hub A is connected to the fixed part B so as to rotate therewith by means of clutch teeth $D^1$ on a ring or sleeve D fixed inside the hub A. The clutch teeth $D^1$ are made to engage corresponding recesses $B^1$ in the fixed part B. The bottoms of the recesses $B^1$ are preferably chambered off at $B^2$, as clearly shown in Figs. 2 and 3. The sleeve or ring D has an inwardly projecting flange $D^2$ provided on its outer face with a ratchet rack $D^3$. The cap E screws on to the fixed part B and projects into the hub A. When screwed right home the flange $E^1$ of the cap E presses on the end of the hub to hold the wheel firmly in position.

F indicates the spring pawls, of which in the present example there are three, which work in pockets $E^2$ in the cap E. The pawls are forced into engagement with the rack $D^3$ by springs $E^3$ which exert their pressure between the bottoms of the pockets $E^2$ and a shoulder on the pawls. The pawls are prevented from being forced too far beyond the cap E by the heads of screws G passing through the pawls F and the springs $E^3$ and screwed into the sliding ring or sleeve H. In the arrangement shown, the heads of the screws G are flat and engage freely in a transverse slot $F^1$ in the toothed end of the pawls. With this arrangement the pawls F can slide along the screws G a sufficient distance to clear the teeth of the rack when riding over them and are at the same time prevented from turning around the fixed screw G. The teeth of the pawls are thus maintained in the proper radial position for engaging the teeth on the rack D³. The ring H is moved outward carrying with it the pawls F against the tension of the springs E³. It will thus be seen that the same springs E³ act both to force the pawls F into engagement with the rack and also to draw the sliding ring H when released, together with the pawls, inward toward the rack I indicates a spring pin or stop which acts in conjunction with a spring catch K to hold the ring H, and therefore the pawls, in their retracted position. Any suitable number of spring pins I may be employed, only one being used in the example shown. The pin I is forced by a spring I¹ toward the right, in Figs. 1 and 2, and is prevented from moving too far in that direction by means of a screw or pin L fixed in the cap E. The axis of the pin I falls about midway across the circular rack D³ and the rack is channeled out at D⁴ to form a smooth surface against which the end of the pin I bears when the ring H is slid outward and the spring catch K engages the head of the pin as shown in Fig. 2. The cap E is recessed at E⁴ to accommodate the spring catch K and one face E⁵ of the recess is formed slanting or inclined to the axis of the wheel. When the cap E is being unscrewed, the inclined face E⁵, during its outward movement, will, as hereinafter described contact with the spring catch K and gradually force it to move outward off the head of the pin I. As soon as the catch is thus tripped from the head of the pin I, the sliding ring H will be drawn inward by the springs E³. The tripping of the catch K will not occur until the cap E has been unscrewed a distance sufficient to carry the pawls F away from the rack D³ and prevent them reëngaging with the rack on their return movement which is effected by the springs E³.

The operation of the device is as follows:—The wheel being placed on the fixed part B, the cap E is screwed on to the part B until the pawls F reach the rack D³. Further screwing of the cap will cause the pawls to ride over the teeth of the rack and be forced into engagement therewith by the springs E³. The cap is thus prevented from being screwed backward. When it is desired to remove the wheel, the sliding ring H is pulled outward, preferably by the fingers of the hands engaging beneath its flange H¹, until it reaches the position shown in Fig. 2. The spring catch K will now spring inward behind the head of the spring pin I and the ring H and the pawls F will be held retracted from the rack D³ as shown. The cap E may now be unscrewed by applying power to its flattened head. The spring I¹ is weaker than the springs E³ so that as the cap E is unscrewed the spring I¹ is compressed, due to the action of the springs E³ through the catch K and pin I, and the ring H carrying the pawls does not at once move outward, but remains for a time at a distance away from the face rack governed by the combined lengths of the pin I and the catch K. When the cap has been removed a sufficient distance, the inclined surface E⁵ will come into contact with the spring catch K and act upon it to force it out beyond the head of the spring pin I. The ring H together with the pawls F will now be drawn inward into a position ready for the cap to be screwed on again when desired.

It will be understood that while I have shown my improved mechanism applied to a detachable wheel revolving with its axle, the improved device is also applicable to wheels mounted to run free on their axles.

Further, modifications may be made in the construction of the parts without departing from the spirit of the invention. For example, instead of forming the inclined surface, or surfaces, E⁵ on the screw cap itself, the same may be formed on a piece or pieces separate from the screw cap and afterward attached thereto by any suitable means.

What I claim as my invention and desire to secure by Letters Patent is:—

1. The combination with a wheel hub of a detachable wheel securing device comprising a cap adapted to engage with the wheel hub, a ring mounted on said cap, spring actuated pawls carried by said ring and adapted to engage with the wheel hub, a pin carried by the cap and disposed parallel to the axis of the wheel hub, a device carried by said ring and coöperable with said pin to hold said pawls out of engaging position, and means associated with the cap coöperable to automatically effect the release of said holding device, substantially as described.

2. The combination with a wheel hub of a detachable wheel securing device comprising a cap adapted to engage with the wheel hub, a ring mounted on said cap, spring actuated pawls carried by said ring and adapted to engage with the wheel hub, a spring actuated pin carried by the cap and disposed parallel to the axis of the wheel hub, a device carried by said ring and coöperable with said pin to hold said pawls out of engaging position, and said cap having an inclined surface adapted to engage with and automatically effect the release of said holding device when the cap has been unscrewed to such an extent that the rack is out of range of said pawls, substantially as described.

3. The combination with a wheel hub of a detachable wheel securing device comprising a cap adapted to engage with the wheel hub, a ring mounted on said cap, a plurality of pawls carried by said ring, springs associated with said pawls and adapted to hold the same in engagement with the wheel hub, a pin carried by the cap and disposed parallel to the axis of the wheel hub, a resilient member carried by the ring and adapted to engage with said pin to hold the cap and ring separated and the pawls out of engaging position, said cap having an inclined surface adapted to engage with and automatically release said resilient member and allow said pawl springs to restore said pawls and the ring and cap to normal positions, when said cap has been unscrewed to such an extent that the rack is out of range of said pawls, substantially as described.

4. The combination with a wheel hub of a detachable wheel securing device comprising a cap adapted to engage with the wheel hub, said cap being provided with a plurality of recesses, a ring mounted on said cap, bolts secured to said ring and disposed within said cap recesses, pawls movably mounted on said bolts within said recesses, springs mounted on said bolts, operable to hold said pawls in engagement with the wheel hub, a spring pin carried by the cap and disposed parallel to the axis of the wheel hub, a resilient member carried by said ring and adapted to engage with said pin to hold said cap and ring separated and the said pawls out of engaging position, and said cap having an inclined surface adapted to engage with and automatically release said resilient member whereby to restore said cap, ring and pawls to normal position when the cap has been unscrewed to such an extent that the rack is out of range of said pawls, substantially as described.

5. The combination with a wheel hub of a detachable wheel securing device comprising a cap adapted to engage with the wheel hub, a ring slidably mounted on said cap, spring actuated pawls carried by said ring and adapted to engage with a channeled ratchet rack on the removable hub, a pin carried by the cap and disposed parallel to the axis of the wheel hub, said pin projecting beyond the face of the cap and engaging the channel in said rack, a resilient member carried by said ring and adapted to engage with said pin to hold said cap and ring separated and the said pawls out of engaging position, said cap having an inclined surface adapted to engage with and automatically release said resilient member whereby to restore said cap, ring and pawls to normal position when the cap has been unscrewed to such an extent that the rack is out of range of the pawls, substantially as described.

In testimony whereof I have signed my name to this specification in the presence of two subscribing witnesses.

STEPHEN JAMIESON RALPH.

Witnesses:
  J. H. WALTON,
  FRANK I. WHITE.